US008281823B2

(12) United States Patent
Mitrovich et al.

(10) Patent No.: US 8,281,823 B2
(45) Date of Patent: Oct. 9, 2012

(54) REFUELING APPARATUS WITH AN AUTOMATIC STOP

(75) Inventors: Michael J. Mitrovich, Kenmore, WA (US); John Byrne, Springfield, MO (US)

(73) Assignee: Spillx L.L.C., Kenmore, WA (US)

( * ) Notice: Subject to any disclaimer, the term of this patent is extended or adjusted under 35 U.S.C. 154(b) by 222 days.

(21) Appl. No.: 12/485,646

(22) Filed: Jun. 16, 2009

(65) Prior Publication Data
US 2011/0079320 A1  Apr. 7, 2011

Related U.S. Application Data

(60) Provisional application No. 61/061,922, filed on Jun. 16, 2008.

(51) Int. Cl.
*B65B 3/26* (2006.01)
(52) U.S. Cl. ........ 141/198; 141/303; 141/350; 137/413; 220/86.2
(58) Field of Classification Search .................. 141/198, 141/83, 192, 301–303, 350; 137/413, 391, 137/398, 409, 202; 220/86.2, 86.3
See application file for complete search history.

(56) References Cited

U.S. PATENT DOCUMENTS

| 751,096 | A | 2/1904 | Nethry |
| 993,628 | A | 5/1911 | Williams |
| 1,302,538 | A | 5/1919 | Gulick |
| 1,525,247 | A | 2/1925 | Leiss |
| 1,555,755 | A | 9/1925 | Pratt |
| 1,676,084 | A | 7/1928 | Flagg |
| 1,694,072 | A | 12/1928 | Manion |
| 1,788,827 | A | 1/1931 | Ferrin |
| 1,826,088 | A | 10/1931 | Ostlind |
| 2,092,670 | A | 9/1937 | Hess |
| 2,477,186 | A | 7/1949 | Koehler |
| 2,825,526 | A | 3/1958 | Zuiderhoek |
| 3,269,404 | A | 8/1966 | Lebow |
| 3,907,248 | A | 9/1975 | Coulbeck |
| 3,929,155 | A | 12/1975 | Garretson |
| 4,064,907 | A | 12/1977 | Billington |
| 4,305,422 | A | 12/1981 | Bannink |
| 4,313,459 | A | 2/1982 | Mylander |
| 4,770,317 | A * | 9/1988 | Podgers et al. ............ 220/86.1 |
| 5,002,154 | A | 3/1991 | Chen |
| 5,027,871 | A | 7/1991 | Guenther |
| 5,282,496 | A | 2/1994 | Kerger |

(Continued)

FOREIGN PATENT DOCUMENTS
EP  144549  6/1985
(Continued)

OTHER PUBLICATIONS

Pursuant to MPEP § 2001.6(b) Applicant brings the following co-pending application to the Examiner's attention: U.S. Appl. No. 12/767,310.

(Continued)

*Primary Examiner* — Timothy L Maust
*Assistant Examiner* — Timothy Kelly
(74) *Attorney, Agent, or Firm* — Buchanan Nipper

(57) ABSTRACT

A refueling apparatus. The refueling apparatus having a combination float control module and fluid flow control valve for use in high pressure, high flow rate refueling systems. The refueling apparatus further having a fluid flow control valve module, a fluid level sensor module having a sensor, and a testing module.

10 Claims, 12 Drawing Sheets

U.S. PATENT DOCUMENTS

| | | | |
|---|---|---|---|
| 5,454,421 A | 10/1995 | Kerger | |
| 5,460,197 A | 10/1995 | Kerger | |
| 5,487,404 A | 1/1996 | Kerger | |
| 5,642,752 A | 7/1997 | Yokota | |
| 5,649,577 A | 7/1997 | Farkas | |
| 5,787,942 A | 8/1998 | Preston | |
| 5,813,432 A | 9/1998 | Elsdon | |
| 5,829,465 A | 11/1998 | Garretson | |
| 5,832,953 A | 11/1998 | Lattner | |
| 5,842,500 A | 12/1998 | Rockwood | |
| 5,887,609 A | 3/1999 | Garretson | |
| 5,921,272 A | 7/1999 | Cavagna | |
| 5,954,101 A | 9/1999 | Drube | |
| 5,992,445 A | 11/1999 | Pagani | |
| 6,026,841 A | 2/2000 | Kozik | |
| D421,788 S | 3/2000 | Kingman | |
| 6,035,888 A * | 3/2000 | Gil | 137/413 |
| 6,076,546 A | 6/2000 | Waters | |
| 6,079,438 A | 6/2000 | Cavagna | |
| 6,109,314 A | 8/2000 | Christophe | |
| 6,138,709 A | 10/2000 | Home | |
| 6,178,994 B1 | 1/2001 | Park | |
| 6,227,233 B1 | 5/2001 | Kozik | |
| 6,230,730 B1 | 5/2001 | Garretson | |
| 6,247,492 B1 * | 6/2001 | Stuart | 137/413 |
| 6,257,287 B1 | 7/2001 | Kippe | |
| 6,263,905 B1 | 7/2001 | Yokota | |
| 6,293,302 B1 | 9/2001 | Waters | |
| 6,311,723 B1 | 11/2001 | Shipp | |
| 6,318,421 B1 | 11/2001 | Lagache | |
| 6,408,869 B1 | 6/2002 | Bartos | |
| 6,415,813 B1 | 7/2002 | Kraft | |
| 6,450,196 B1 | 9/2002 | Bartos | |
| 6,536,465 B2 * | 3/2003 | David et al. | 137/442 |
| 6,557,579 B2 | 5/2003 | Kozik | |
| 6,640,829 B1 | 11/2003 | Kerger | |
| 6,810,905 B1 | 11/2004 | Watson | |
| 6,874,528 B2 | 4/2005 | Kozik | |
| 6,910,499 B2 | 6/2005 | Chan | |
| 7,089,974 B2 * | 8/2006 | Stuart | 141/198 |
| D559,358 S | 1/2008 | Oliveira | |
| 7,584,766 B2 * | 9/2009 | David et al. | 137/413 |
| 7,793,682 B2 * | 9/2010 | Smit | 137/391 |
| 7,891,373 B2 * | 2/2011 | Workman et al. | 137/413 |
| 8,025,076 B2 * | 9/2011 | Smit | 137/391 |
| 2008/0178944 A1 | 7/2008 | Workman et al. | |

FOREIGN PATENT DOCUMENTS

| | | |
|---|---|---|
| GB | 1153381 | 5/1969 |
| GB | 1193007 | 5/1970 |
| GB | 1335188 | 10/1973 |
| GB | 1440107 | 6/1976 |
| GB | 1541110 | 2/1979 |
| GB | 2317382 | 3/1998 |

OTHER PUBLICATIONS

Pursuant to MPEP § 2001.6(b) Applicant brings the following co-pending application to the Examiner's attention: U.S. Appl. No. 13/183,905.

* cited by examiner

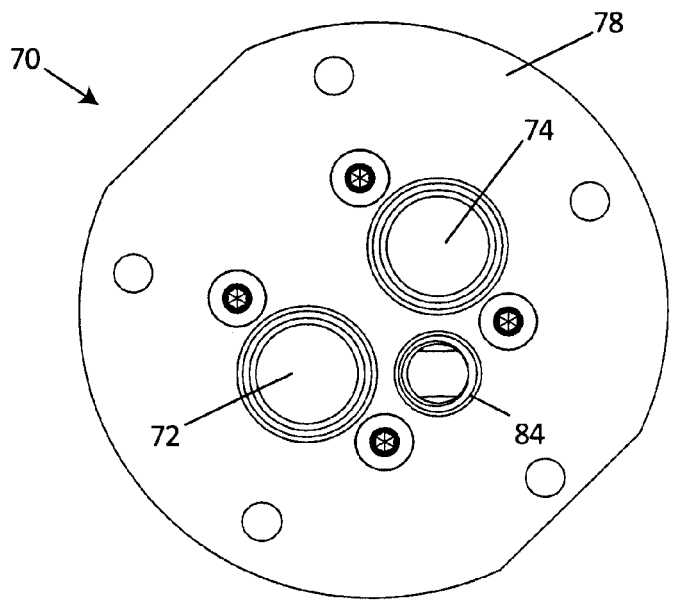
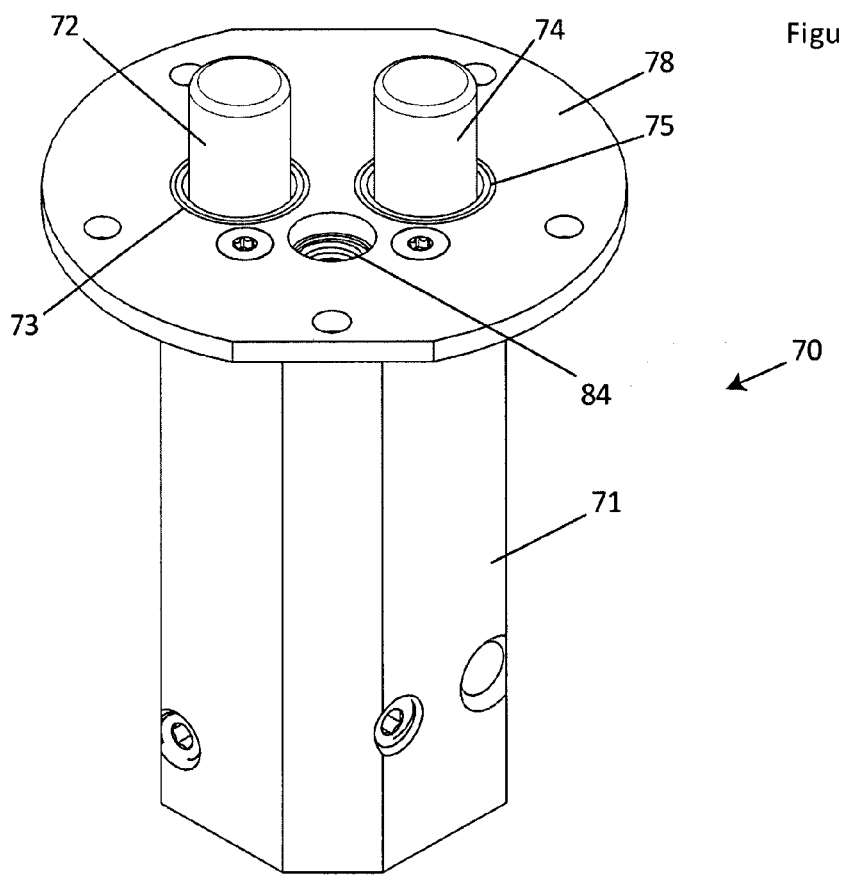
Figure 10
Figure 11

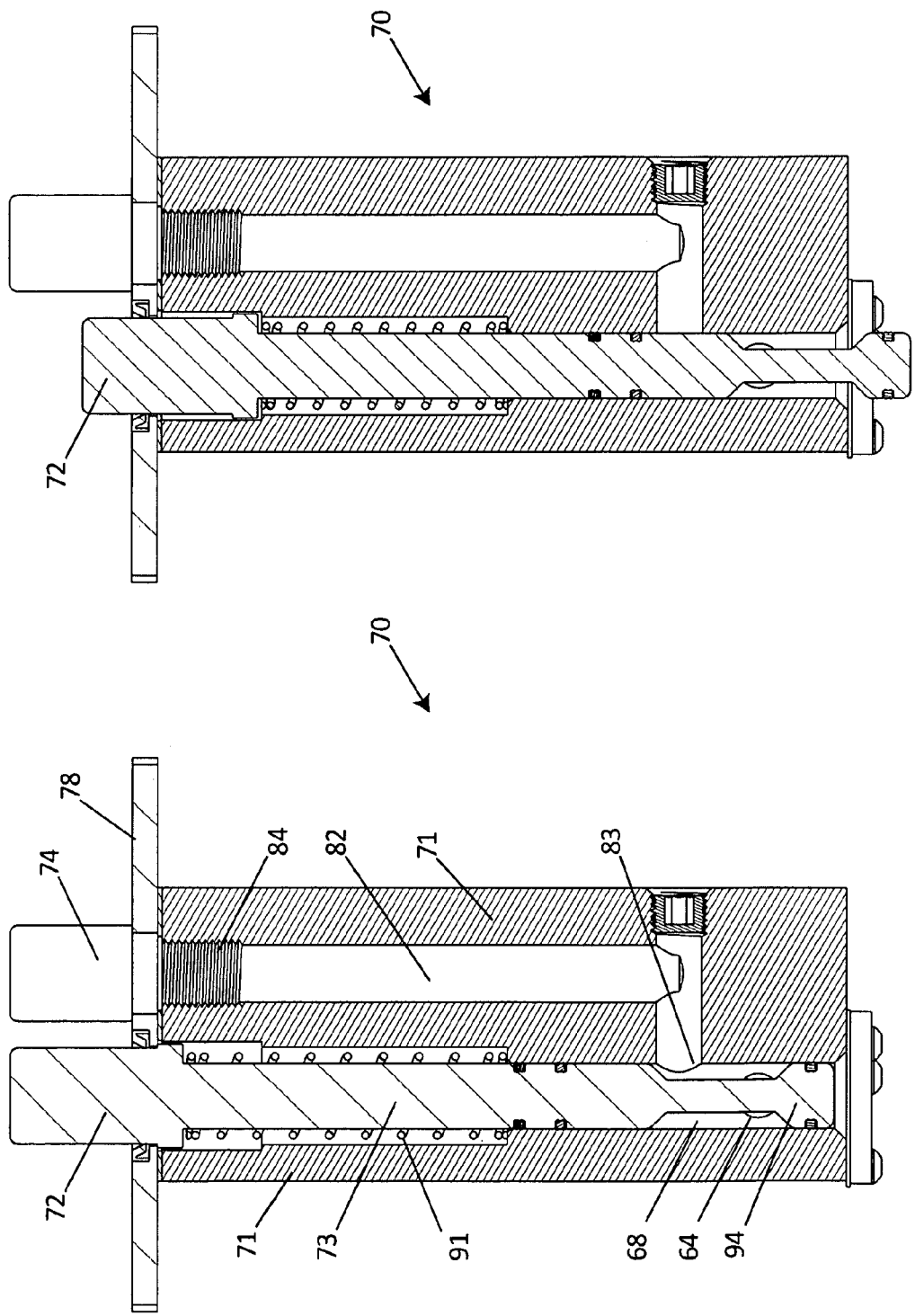

US 8,281,823 B2

REFUELING APPARATUS WITH AN AUTOMATIC STOP

CROSS-REFERENCE TO RELATED APPLICATIONS

This application claims the priority date of the provisional application entitled "Refueling Apparatus with an Automatic Stop," filed by Michael J. Mitrovich and John Byrne on Jun. 16, 2008, with application Ser. No. 61/061,922, the disclosure of which is incorporated by reference.

FIELD OF THE INVENTION

The invention relates to generally to refueling apparatuses configured for automatically stopping when a desired refueling level is attained.

BACKGROUND OF THE INVENTION

A variety of applications require the ability to rapidly fill a container with a fluid. To accomplish this rapid filling, the fluid is typically pumped (under pressure) into the container. Due to this rapid filling, such applications typically include means for quickly shutting off the flow of fluid when the container reaches a predetermined level of fluid held therein so as to prevent overfilling and/or spillage of the fluid.

BRIEF DESCRIPTION OF THE DRAWINGS

FIG. 10 is a plan view of a first embodiment of a float control module of the present invention.

FIG. 11 is a perspective view of the embodiment of FIG. 10.

FIG. 13 is a cross-sectional, side view of the embodiment of FIG. 10 along Section B-B showing the reset button in its default position.

FIG. 16 is a cross-sectional, side view of the embodiment of FIG. 10 along Section B-B showing the reset button in its depressed position.

DESCRIPTION OF THE PREFERRED EMBODIMENTS

Figure 1:
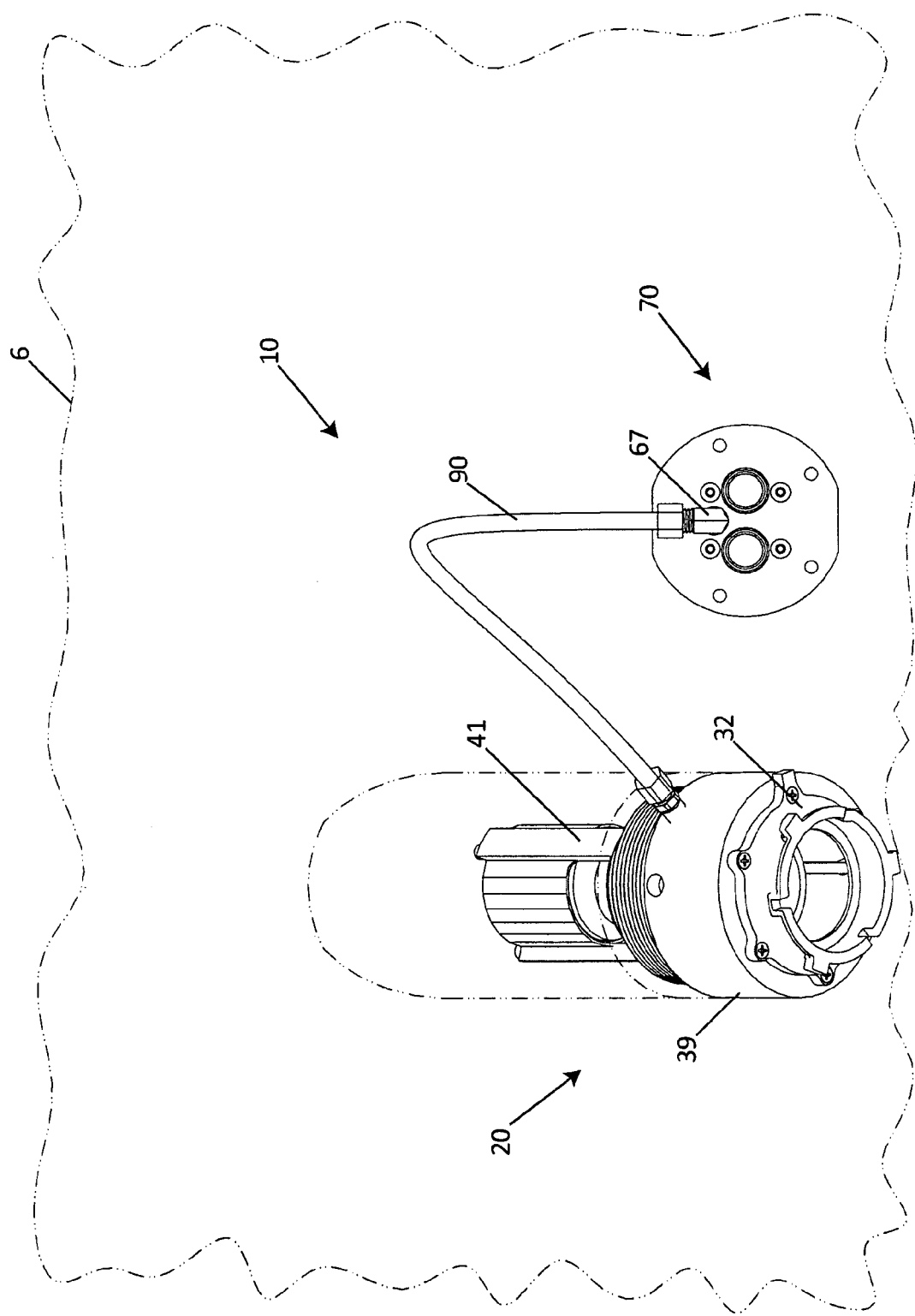
FIG. 1 is an upper perspective view of one embodiment of the present invention, shown installed on a fuel tank.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Further, in the following description and in the figures, like elements are identified with like reference numerals. The use of "or" indicates a non-exclusive alternative without limitation unless otherwise noted. The use of "including" means "including, but not limited to," unless otherwise noted.

FIGS. 1-18 show one embodiment of a refueling apparatus with an automatic stop. The refueling apparatus comprising a fluid flow control valve 20 which, working in concert with a float valve (float control module) 70, can be opened or closed, thereby shutting off a flow of fuel into a container 6 (e.g., fuel tank). The container having air space above a fluid space, surface of the fluid space defining a fluid level within said container.

Discussing initially FIGS. 1-9, the receptacle 32 of a dry disconnect coupling (comprising a coupler and a receptacle), such as those made by Whitaker, connects to the fluid flow control valve 20. This receptacle 32 configured for mating with the dry disconnect coupling's coupler (not shown). A single point dry break coupler is preferred, with API style dry break couplers likewise being useful. The dry disconnect coupling 30 allowing a fluid conduit (not shown), such as a fuel supply line, to be fluidly connected with a container, such as a fuel tank on a diesel locomotive. The utilization of a dry disconnect coupling is well known in the prior art, for instance as shown in U.S. Pat. No. 6,155,294 to Cornford.

In operation, upon connecting the coupler to the receptacle 32 of the valve body 40, a lever (not shown in the drawings) is engaged which causes the poppet valve of the coupler to force open the poppet valve 33 of the receptacle 32 (or vice versa), thereby allowing fluid to be pumped from the fluid conduit, through the dry disconnect coupling and into the fluid flow control valve 20. Upon disengagement of the lever, the poppet valve of the coupler moves away from the poppet valve 33 of the receiver, allowing the receiver's poppet valve 33 to close, thereby preventing spillage of fluid (fuel) out of the receptacle (tank) after filling (fueling) is complete (at disconnect).

Figure 4:
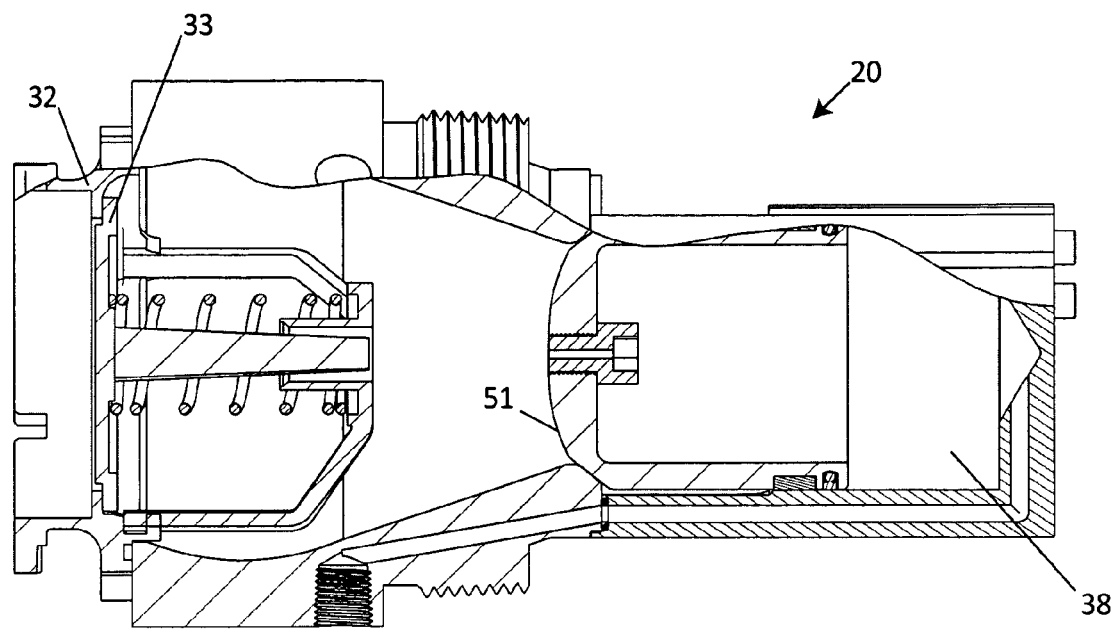
FIG. 4 is a cross-sectional, side view of a first embodiment of a fluid flow control valve of the present invention, shown with the valve closed.
Figure 6:
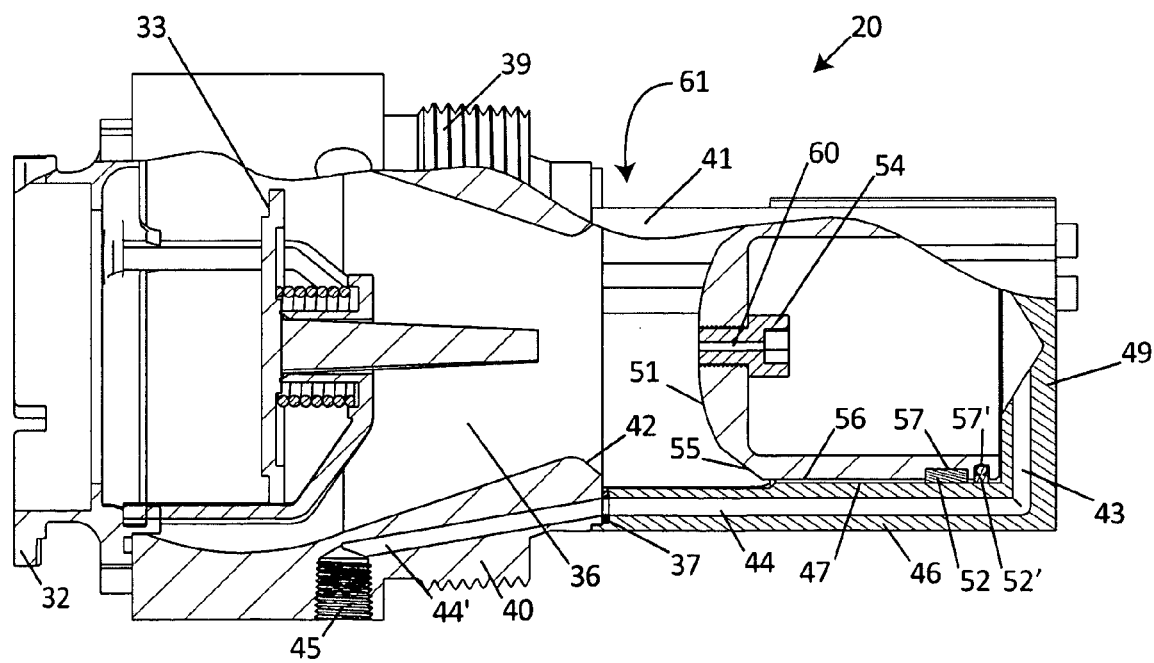
FIG. 6 is a cross-sectional, side view of a first embodiment of a fluid flow control valve of the present invention, shown with the valve open.
Figure 5:
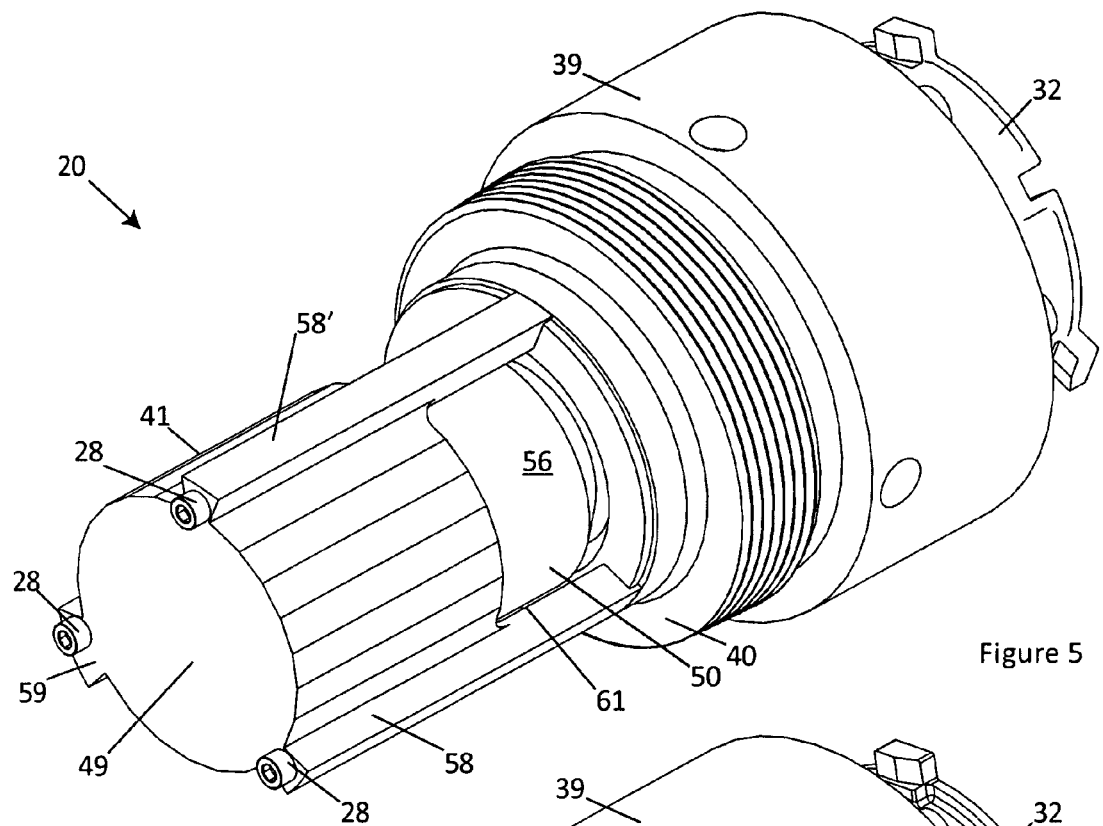
FIG. 5 is a perspective view of the embodiment of FIG. 4, shown with the valve closed.
Figure 7:
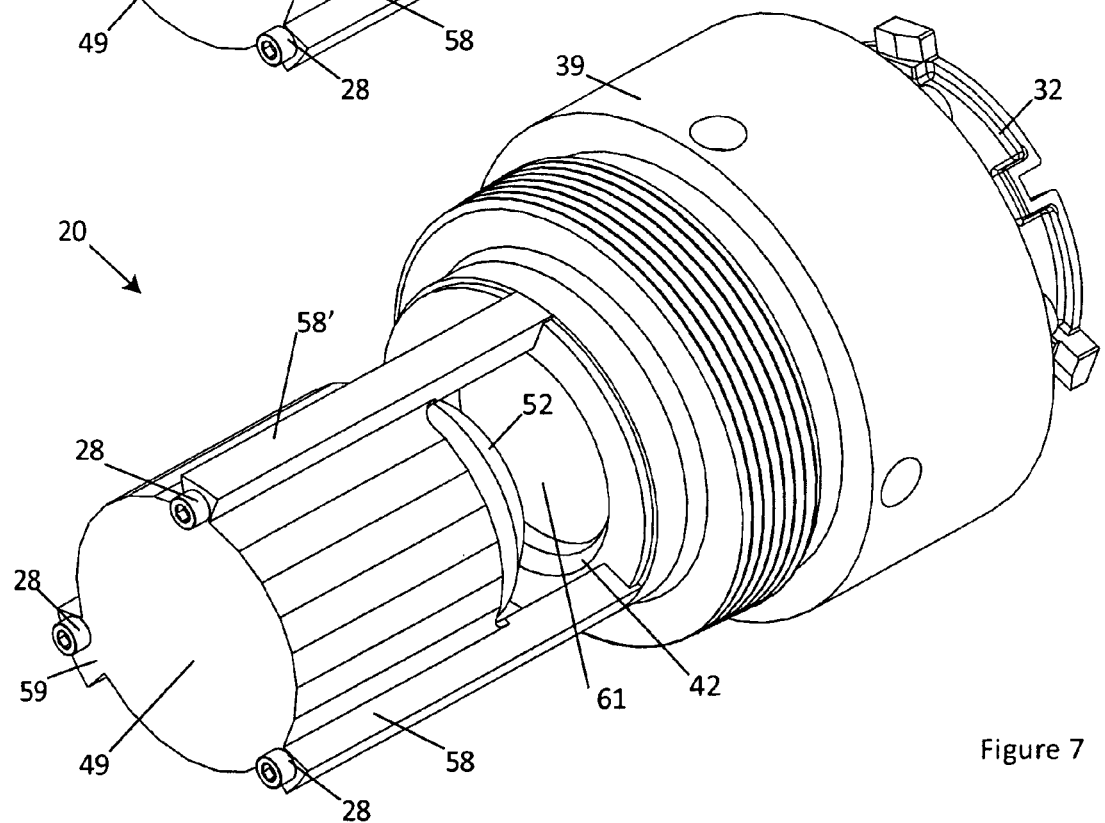
FIG. 7 is a perspective view of the embodiment of FIG. 4, shown with the valve closed.
Figure 8:
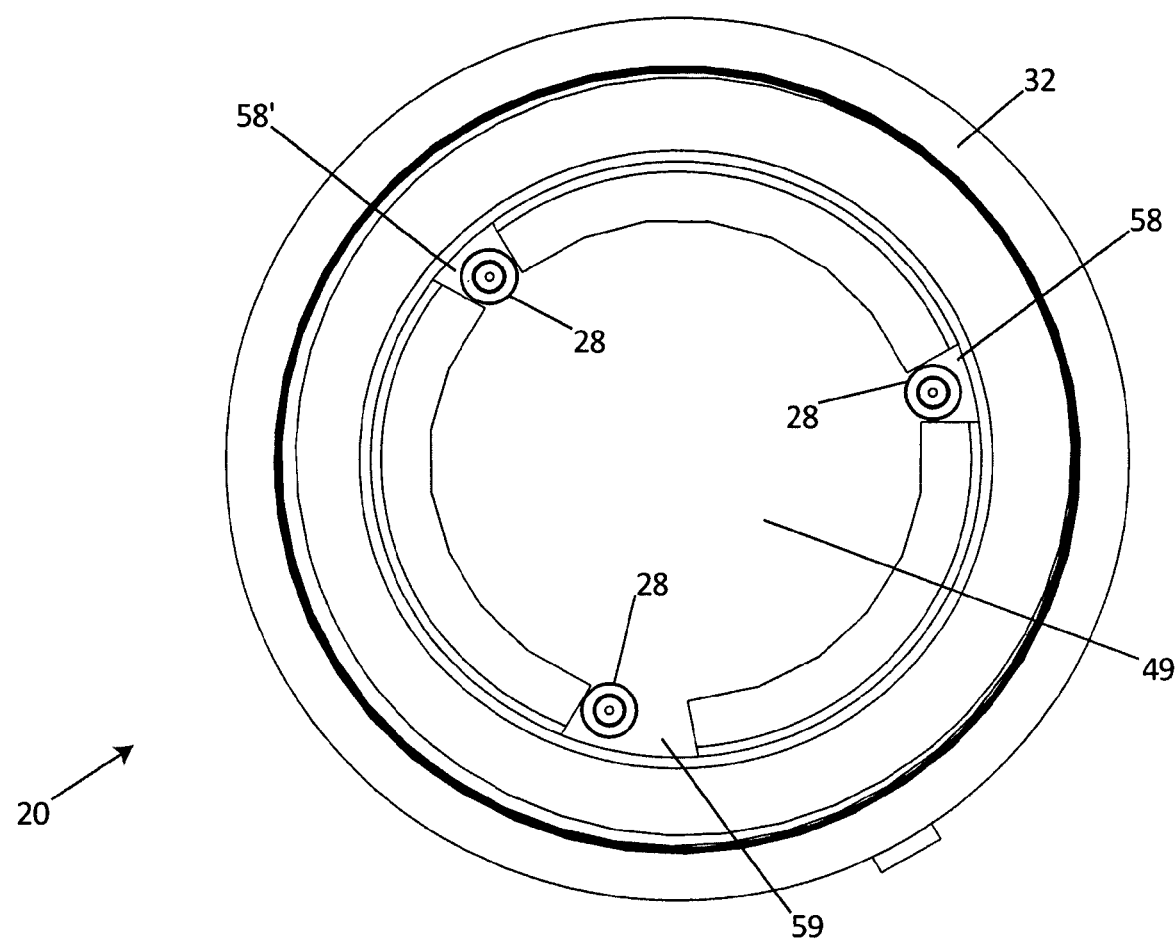
FIG. 8 is an end view of the embodiment of FIG. 4
Figure 9:
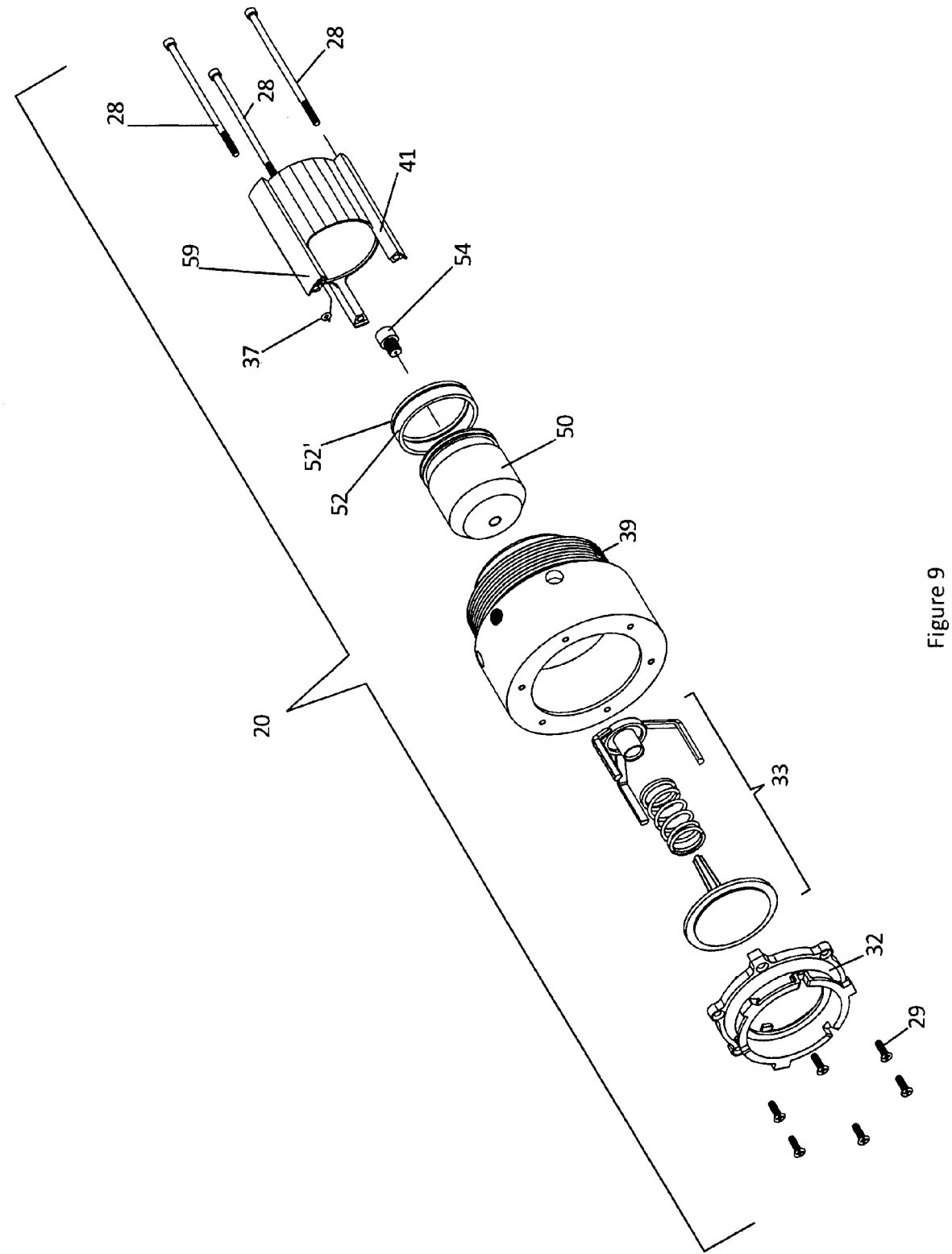
FIG. 9 is an exploded view of the embodiment of FIG. 4.

As illustrated in FIGS. 4 and 6, the receptacle 32 of the fluid flow valve 20 fluidly connecting with a valve body 40. The valve body 40 comprising an upper portion 39 and a lower portion 41. It is preferred that the receptacle 32 be bolted to the valve body 40 via a number of bolts 29 at the upper portion 39. The opposite end of the upper portion 39 comprising an orifice defining a seat 42 configured for mating engagement with a beveled edge of the head of a piston. The internal space of the upper portion 39 defining a first chamber 36 therein.

The upper portion 39 preferably having external threading for allowing the valve body 40 to be screwed into a threaded hole within wall of the container (preferably the top wall of the container). In such an arrangement, the upper portion 39 is installed generally outside of the container. Other manners of mounting the body of the valve to the container are likewise possible. For instance, the utilization of a flange that is bolted onto the container.

The upper portion 39 also preferably having an upper fluid bleed passage 44' configured to fluidly align with a lower fluid bleed passage 44 of the lower portion 41. Preferably, an O-ring or other seal is used at such a connection for preventing leakage, such as a bleed passage O-ring 37. The upper fluid bleed passage 44' terminating at an upper port 45. This upper port 45 configured for connecting, via suitable supply line 90 or other passageway, to a float control module 70.

The lower portion 41 having a piston housing 46 configured for receiving a piston 50 therein. The piston housing 46 having an internal sidewall 47 defining an open topped cylinder in which the piston 50 is slidably received.

Extending from the piston housing 46 are a plurality of legs, preferably three legs (58, 58', 59), which include therethrough holes for receiving bolts 28 used to bolt the lower portion 41 to the upper portion 39. The legs also define lateral fluid flow passages 61 there-between for allowing fluid passing through the fluid flow control valve 20 to be conveyed into the container (fuel tank). The lateral fluid flow passages 61 can be best seen in FIG. 7 as being open, and in FIG. 5 as being almost closed (the piston's head 51 almost sealing against the seat 42 (sealing would effectively close them).

Preferably extending through one of the legs 59 is the lower fluid bleed passage 44 that is, as described above, configured to fluidly align with the upper fluid bleed passage 44' (best shown in FIGS. 4 and 6). The legs (58, 58', 59) terminating at a first end of the lower portion 41, and an end wall 49 preferably exists at generally the second end of the lower portion. Preferably, adjacent to the end wall 49 is a lower port 43 (shown in FIGS. 4 and 6) fluidly connected with the lower fluid bleed passage 44. This lower port 43 fluidly connected with the second chamber 38.

The piston 50 having a head 51, the head preferably being beveled 55. The beveled portion of the head configured for creating a mating seal against the seat 42. It is preferred that the piston 50 be hollow. The piston 50 having an external sidewall preferably containing a of pair concentric sidewall grooves (57, 57') configured for receiving at least one sealing member (52, 52') therein. The sealing members (e.g., O-rings, Teflon seals) sealing the piston external sidewall 56 to the housing internal sidewall 47.

In the preferred embodiment, no spring is needed for biasing the piston's beveled head against the seat 42 of the upper portion 39. The effective area of the piston is larger than the effective throat area of the receiver (tapered bore). No spring is needed for biasing the piston's beveled head against the seat of the upper portion because of this difference in areas and pressure. During fueling conditions, once the bleed passage (43/44/44') has been blocked, the area above the piston has high fluid velocity (low pressure) and the area below the piston has low fluid velocity (high pressure). The effective area of the throat of the receiver is smaller than the effective area of the piston. The net force (pressure multiplied by area) on the piston moves the piston upwards into the receiver, shutting off the flow. During no-flow conditions or when the system has shut down, the piston is engaged into the receiver. The pressures are equal on each side of the piston, as both fluid flows are zero. In order for the piston to still remain sealed the piston area must be greater than the throat area. The result is that a spring is not necessary for biasing the piston's beveled head against the seat of the upper portion.

Preferably, the head of the piston 50 has a bleed hole/passage 60 defined there-through, the bleed hole 60 interconnecting the first chamber 36 with the second chamber 38. Preferably, the bleed passage 60 is configured for receiving a piston jet 54 therein (preferably by threading), the piston jet 54 for allowing the diameter of the bleed passage 60 to be modified for testing purposes. Alternatively, no piston jet could be included, and desired flow could be created based upon the diameter of the bleed passage 60 itself.

The fluid flow control valve 20 is configured for use with a float valve. The preferred float valve (the "float control module 70") is shown in the drawings (FIGS. 1-3, 10-18). The float control module 70 comprising a body 71 configured for extending into the container/fuel tank. In the preferred embodiment, the float control module body 71 defining a reset bore 73, a test bore 75 and an upper float bore 81 extending therein from the top face of the body 71.

Figure 2:
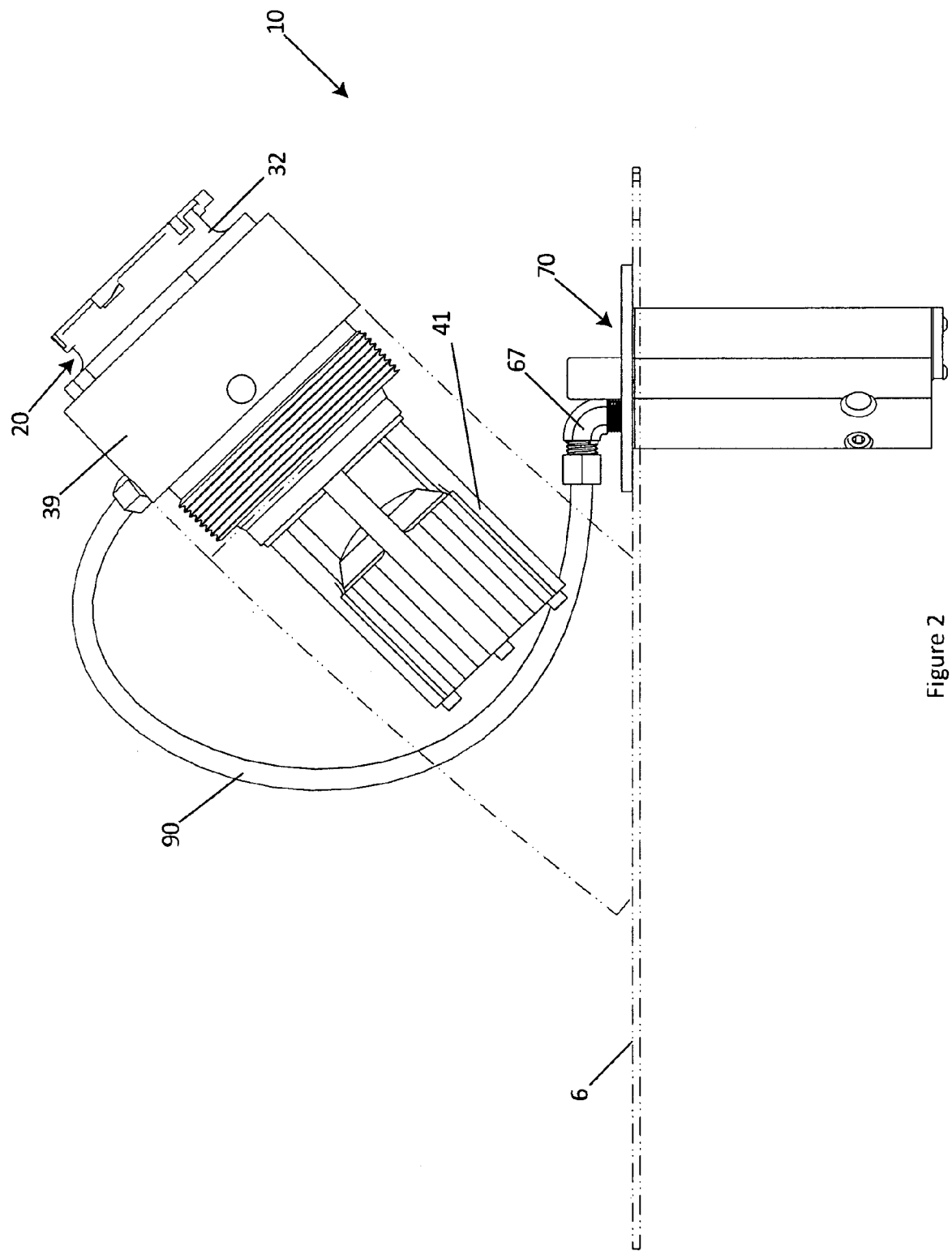
FIG. 2 is a first side view of the embodiment of FIG. 1.
Figure 3:
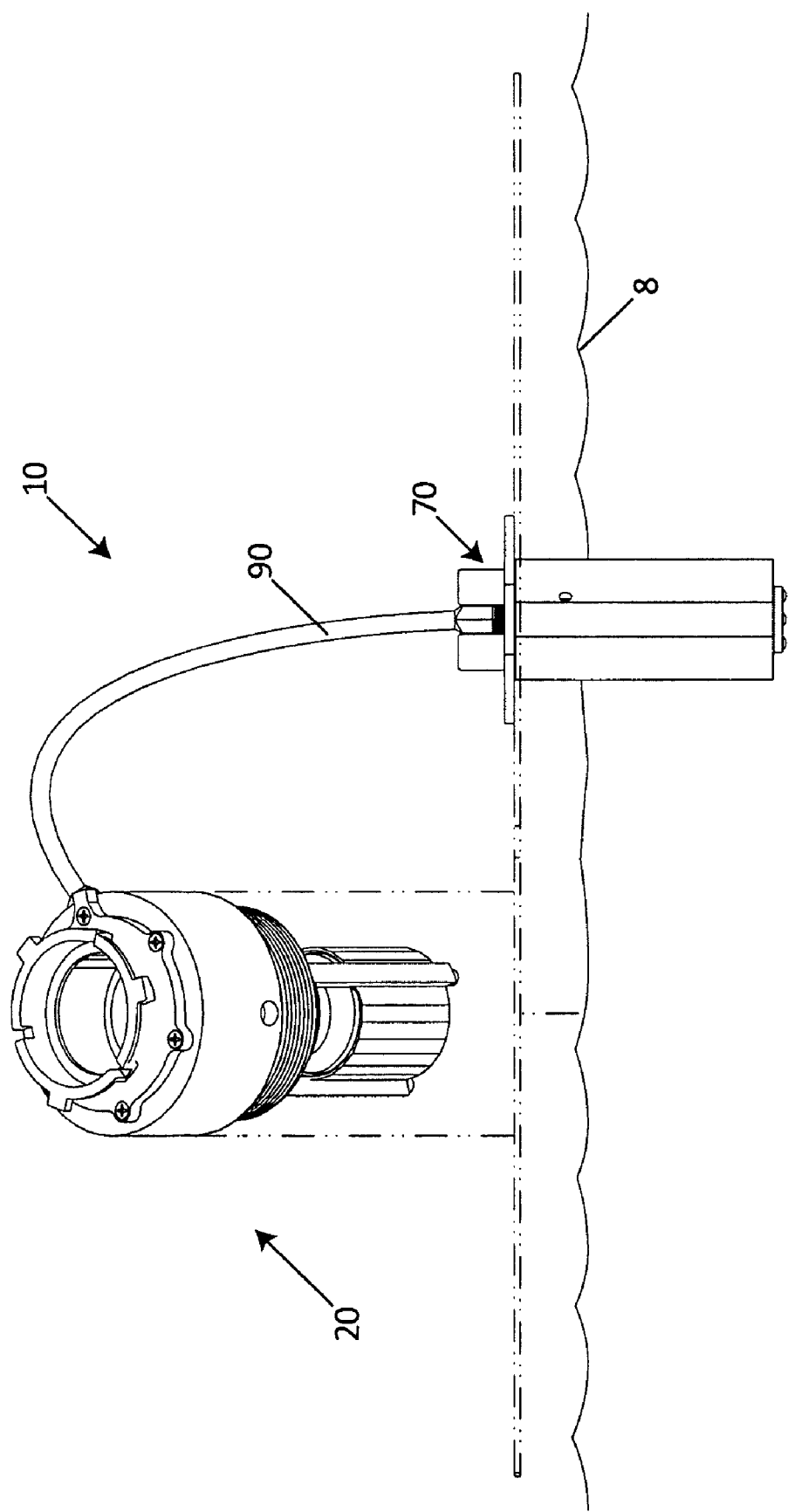
FIG. 3 is a side perspective view of the embodiment of FIG. 1.

The bleed conduit 90 (as shown in FIGS. 1-3) attaches in between the upper port 45 (shown in FIGS. 4 and 6) of the fluid flow control valve 20 and the inlet port 84 of the float control module 70. This bleed conduit 90 for fluidly interconnecting the two components and allowing the float control module 70 to automatically close the fluid flow control valve 20 upon a predetermined level of fluid in the container being reached (for instance, the fluid level 8 shown in FIG. 3). The bleed conduit 90 connecting to the float control module body 71 at an inlet port 84, preferably in the top face of the body 71 (visible in FIGS. 10-11 through a hole defined in the mounting flange 78).

The preferred bleed conduit 90 being twenty-four (24) inches long, however other lengths may be utilized, particularly dependent upon the distance apart the float control module and fluid flow control valve are located. In FIGS. 1-3, a fitting 67 is utilized to make the connection between the conduit 90 and the inlet port 84. The inlet port 84 fluidly connecting with an inlet bore 82 (FIGS. 13 and 16) via a conduit 64. The inlet bore 82 extending into the body 71 and fluidly connecting the bleed conduit 90/inlet port 84 with the reset bore 73 at a lower inlet bore port 83.

The upper float bore 81 connects to a lower float bore 85 via a float pin passageway 87. An air vent passageway 88 is preferably provided near the top of the upper float bore, through the sidewall of the body 71 below the mounting flange 78 for enabling venting of air into and out of the upper float bore. The upper float bore 81 receives therein a float 80. The float 80 comprising an upper end, and a lower end. The lower end comprising a pin 79 extending therefrom. This pin 79 extending through the float pin passageway 87 and connecting with a lower float base 77. The outlet port 86 extends through the body 71 and into the lower float bore 85. A lower (bottom) outlet port 86' may also be provided. As the float rises, the base 77 is raised and brought into sealing engagement with a sealing face 89 thereby closing the float valve by blocking fluid passage from the inlet port 84 out the outlet port 86.

Conceptually, the fluid flow control valve 20 operates the same way the prior art valves do, for instance, the Shipp valve (U.S. Pat. No. 6,311,723). When the fluid conduit (e.g., fueling hose) is connected to the refueling apparatus 10 (the coupler and receptacle 32 of the dry disconnect coupling connected together) and fluid (e.g., fuel) is pumped under pressure by a pump, the fluid pressure on the head 51 of the piston moves the spring biased piston 50 (from its "first" position), towards the end wall 49 to open the fluid passages 61 (into the piston's "second" position). The fluid flows from the first chamber 36, through the fluid passages 61 and into the container 6 (e.g., fuel tank). A portion of the fluid passes through the bleed hole 60 (in the piston 50), into the second chamber 38, flows through the lower port 43, through the fluid bleed passages 44, 44', through the upper port 45, through a bleed conduit 90 to the float control module 70 and into the container as long as the float control module's float valve is open.

When the fluid level reaches a preset level (covering the outlet ports (86, 86'), fluid flows into the float chamber via the float chamber passageway 69, causing the float 80 to rise. As the float raises, the base 77 is raised and brought into sealing engagement with a sealing face 89 thereby closing the float valve by blocking fluid passage from the inlet port 84 out the outlet port 86 and thereby preventing fluid flow through the bleed passages (44, 44'). The pressures on both sides of the piston 50 (the first chamber 36 and the second chamber 38) then equalize, and the buoyancy of the piston, coupled with the equalization in the pressure in the first and second chambers, urges the piston 50 back to the first position where it closes the lateral fluid flow passages 61 to prevent any further fluid flow through the fluid flow control valve 20 to the container.

Figure 17:
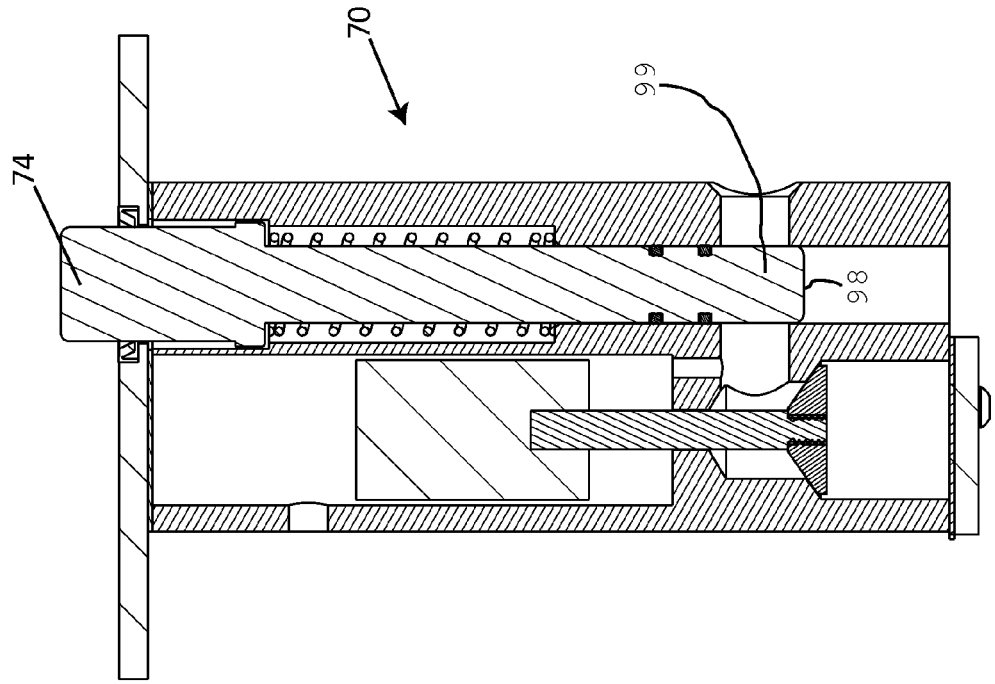
FIG. 17 is a cross-sectional, side view of the embodiment of FIG. 10 along Section C-C showing the test button in its depressed position.
Figure 14:
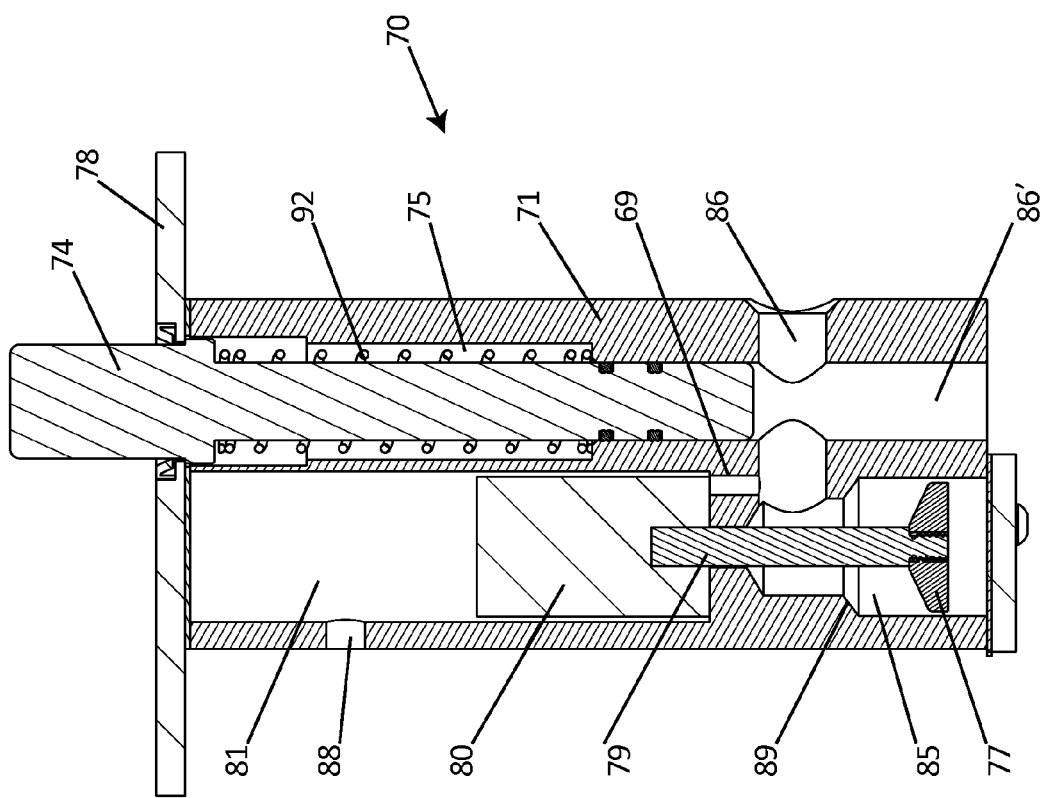
FIG. 14 is a cross-sectional, side view of the embodiment of FIG. 10 along Section C-C showing the test button in its default position.
Figure 18:
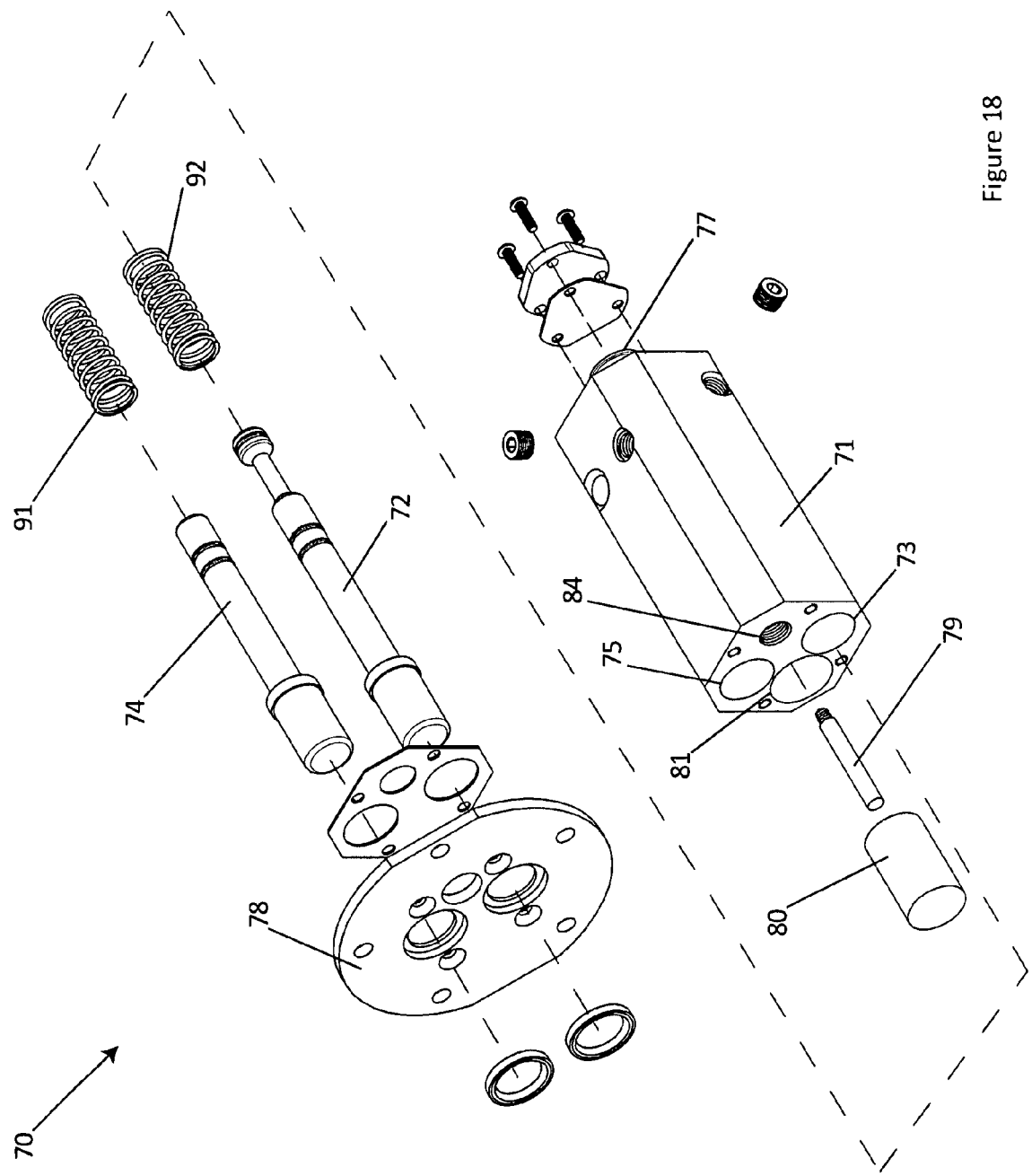
FIG. 18 is an exploded view of the embodiment of FIG. 10.

The present invention also includes an apparatus for testing whether or not the float control module 70 is functioning appropriately and an apparatus for resetting the system. The test bore 75 receives therein a test button 74. The test button 74 being mounted within the test bore 75 via a test spring 92. The test spring 92 keeping the test button biased against mounting flange 78, held in an "open" position (as shown in FIG. 14) and able to move up and down within the test bore 75 when an operator depresses the test button. As illustrated in FIG. 17, the test button 74 having a valve member 99 adjacent the distal end 98 of the test button 74. Depression of the test button 74 (as shown in FIG. 17) results in blockage of the outlet ports (86, 86') by the valve member 99, which simulates a full container causing termination of refueling. Blocking the outlet ports (86, 86') results in the float bore 81 backfilling with bleed fluid from the inlet and the float valve closing, simulating the effect of fluid level in the container rising above the outlet ports (86, 86').

Reset functionality (after testing) is accomplished via a reset button 72 received within the reset bore 73 (as can be seen particularly in FIGS. 12, 13, 15 and 16). The reset button 72 having a second end 94 located adjacent the lower inlet bore port 83 in the sidewall of the reset bore 73, whereby the reset button's body has a grooved portion 68 defined therein for allowing passage of fluid through the reset bore 73 and into the lower float bore 85 when the reset button 72 is its open position (shown in FIGS. 12 and 13). The reset button 72 being held by default in its open position by a spring 91.

Figure 15:
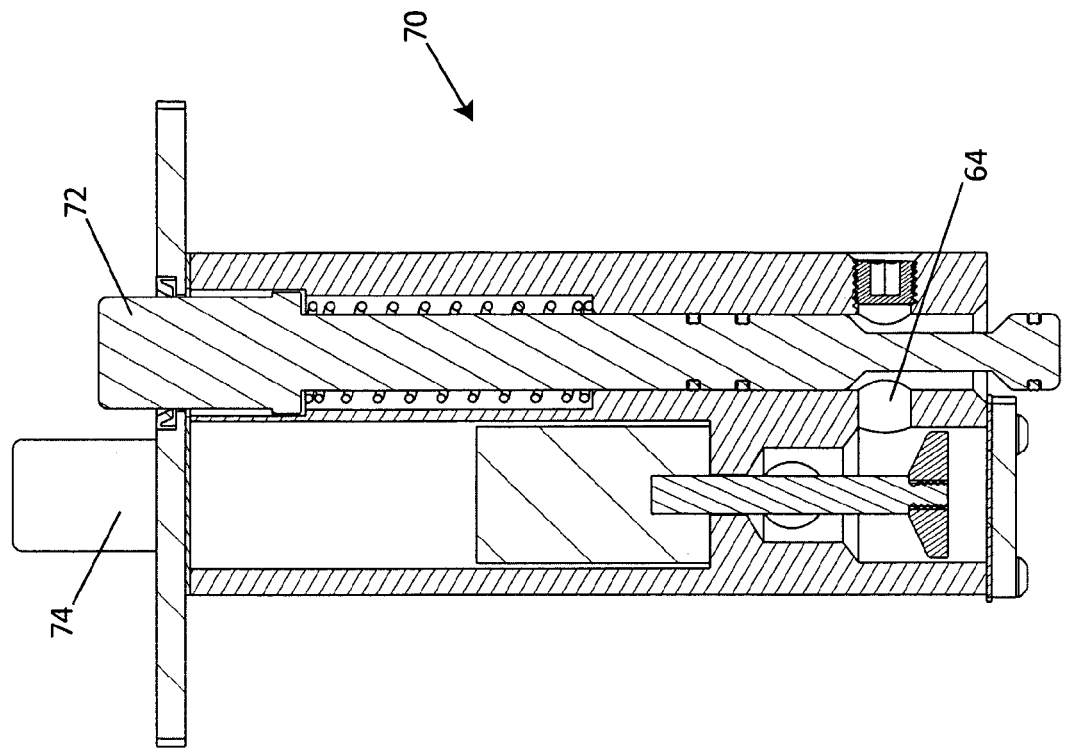
FIG. 15 is a cross-sectional, side view of the embodiment of FIG. 10 along Section A-A showing the reset button in its depressed position.
Figure 12:
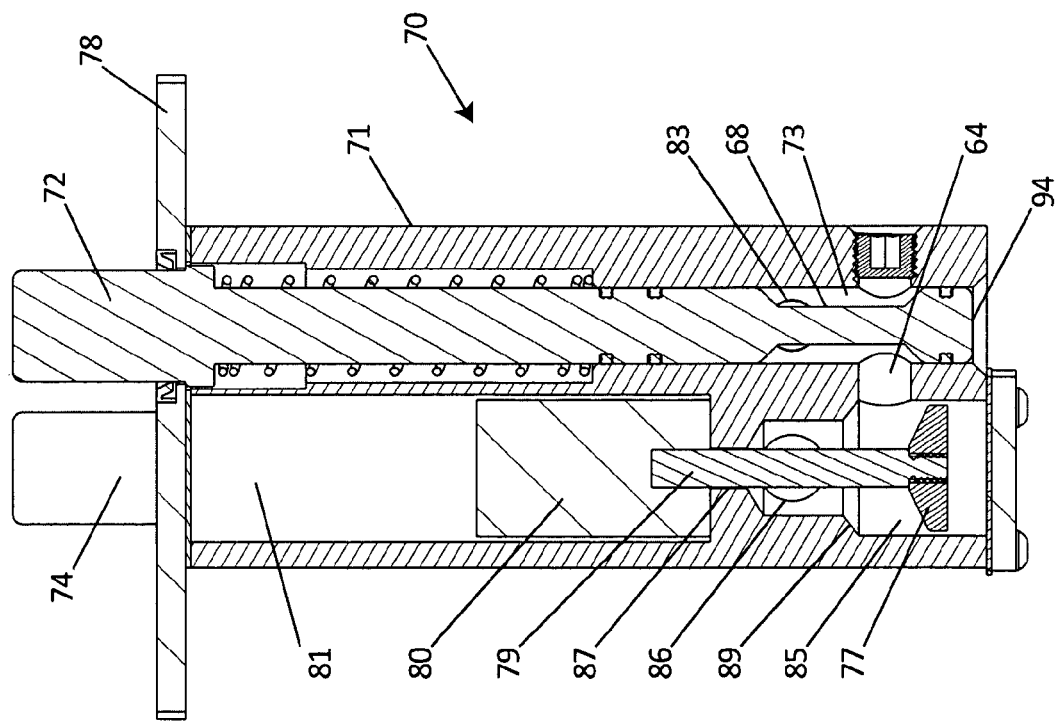
FIG. 12 is a cross-sectional, side view of the embodiment of FIG. 10 along Section A-A showing the reset button in its default position.

When the reset button 72 is depressed (after the test button was depressed), the grooved portion 68 moves past the lower inlet bore port 83 resulting in the sidewall of the ungrooved portion of the reset button's body generally closing said lower inlet bore port 83 and blocking any further bleeding of fluid through the conduit, as is shown in FIGS. 15 and 16. This enables independent testing of the float control module and the fluid flow control valve. Depressing the reset button 72 also causes the second end 94 to exit the reset bore 73 and thereby allowing fluid within the lower float bore to drain through the grooved portion and out into the tank, thereby resetting the float.

The drawings showing that the reset button and test button are slightly recessed within the button retaining cap. Such recessing may or may not be present in a given embodiment.

In the preferred embodiment, a hole is drilled into the container's top surface through which the module 70 is inserted (as is shown in FIGS. 1-3). The module having a mounting flange 78 whereby fasteners, such as bolts, can be used to attach the module 70 to the container with a portion of the module extending into the container.

The preferred material used for construction of the reset button, test button, float pin base, and piston is an acetal homopolymer, such as polyoxymethylene, for instance DuPont Delrin™. The preferred material used for construction of the float is Nitrophyl®. The preferred material used for construction of the float pin is nylon. The preferred material used for construction of the bolt flange plate is 10 gauge stainless steel. While these are the "preferred" materials, other suitable materials may also be used.

A first embodiment comprising a refueling apparatus for use in refilling a container with a fluid, said refueling apparatus comprising: a fluid flow control valve module, said fluid flow control valve module having a fluid passage therethrough for connection with a fluid source, said fluid flow control valve module having a shutoff valve, wherein said fluid is able to travel from said fluid source through said fluid flow control valve module and into said container when said shutoff valve is open, and wherein when said shutoff valve is closed said fluid is prevented from flowing through said fluid flow control valve module, wherein said fluid level sensor is able to control the opening and closing of said shutoff valve; said fluid level sensor module having a sensor configured sensing the level of fluid in said container, said fluid level sensor module configured for closing said fluid flow control valve module upon said sensor sensing that said fluid level is higher than a predetermined level in said container and opening said fluid flow control valve module upon said sensor sensing that said fluid level is lower than a predetermined level in said container; and a testing module, wherein said testing module comprises means for simulating a predetermined fill level in said container thereby allowing the function of the fluid level sensor module to be tested.

A second embodiment comprising a refueling apparatus for use in refilling a container with a fluid, said container having air space above a fluid space, said fluid having a fluid level within said container, said refueling apparatus comprising: a fluid flow control valve, said fluid flow control valve connecting with a fluid source containing fluid, wherein said fluid is able to travel from said fluid source through said fluid flow control valve and into said container when said fluid flow control valve is open, and wherein when said fluid flow control valve is closed said fluid is prevented from flowing through said fluid flow control valve, said fluid flow control valve comprising a valve body, said valve body comprising an upper portion and a lower portion, said upper portion comprising an orifice defining a tapered seat configured for mating engagement with a beveled edge of the head of a piston, wherein the internal space of the upper portion defines a first chamber, said lower portion having a piston housing configured for receiving said piston therein, said piston housing having an internal sidewall defining an open topped cylinder having an end wall, the piston slidably received within said cylinder, the space within the cylinder between the end wall and the piston defining a second chamber, wherein at least one lateral fluid flow passage is defined in said internal sidewall, said at least one lateral fluid flow passage for allowing fluid passing through the fluid flow control valve to be conveyed into the container, wherein said piston's head sealing against the seat closes said at least one lateral fluid flow passage, said lower portion comprising a lower port interconnecting said second chamber with a bleed passage terminating at an upper port, said upper port configured for connecting with a supply line connecting with a float control module at an inlet port, said piston having said head with said beveled edge, said edge configured for creating a mating seal against said tapered seat, said piston having an external sidewall having at least one sidewall groove configured for receiving at least one sealing member therein for slidably sealing the piston's external sidewall to the housing's internal sidewall, wherein the said head further comprising a bleed hole defined there-through, said bleed hole interconnecting the first chamber with the second chamber; a float control module, said float control module comprising said inlet port, said inlet port interconnected with an outlet port in said float control module, wherein when the fluid level is below a preset level in said container, the float control module allows the flow of fluid through said inlet port to said outlet port, and wherein when the fluid level is above a preset level in said container, the float control module blocks the flow of fluid through said inlet port to said outlet port causing a fluid pressure difference between the first chamber and the second chamber which moves the piston away from said seat, allowing the fluid to flow from the fluid source, through the fluid flow control valve, out said lateral fluid flow passage, and into said container, wherein as said fluid level raises, said float raises within said upper float bore and connected base raises within said lower float bore until raising of said float brings said base into sealing engagement with a sealing face thereby by blocking fluid passage from the supply line through said inlet port and out said outlet port, thereby shutting off fluid flow through the bleed passage, causing an equalization of pressure between the first and second chambers, the pressure difference urging the piston's beveled head into sealing engagement with the seat, shutting off the flow of fluid from the fluid inlet through the fluid flow control valve; and a testing module, wherein said testing module comprises means blocking said fluid passage from the supply line through said inlet port and out said outlet port thereby simulating a predetermined fill level in said container and allowing the function of the float control module to be tested. Preferably, the float control module comprises: an upper float bore and a lower float bore defined therein, said upper float bore connecting with said lower float bore via a float pin passageway, the float control module comprising an air vent passageway extending through said module for interconnecting the upper float bore with said container air space, said air vent passageway for enabling venting of air into and out of the upper float bore, wherein the upper float bore receives therein a float, the float having an upper end and a lower end, the lower end having a pin extending there-from, said pin extending through the float pin passageway and connecting with a lower float base, the float control module comprising said outlet port extending through said module for interconnecting the lower float bore with said fluid space of said container, wherein when the fluid level is below a preset level in said container, a fluid pressure difference between the first chamber and the second chamber moves the piston away from said seat, allowing the fluid to flow from the fluid source, through the fluid flow control valve, out said lateral fluid flow passage, and into said container, wherein as said fluid level raises, said float raises within said upper float bore and connected base raises within said lower float bore until raising of said float brings said base into sealing engagement with a sealing face thereby by blocking fluid passage from the supply line through said inlet port and out said outlet port, thereby shutting off fluid flow through the bleed passage, causing an equalization of pressure between the first and second chambers, the pressure difference urging the piston's beveled head into sealing engagement with the seat, shutting off the flow of fluid from the fluid inlet through the fluid flow control valve. Preferably, the testing module further comprises a reset means. Preferably, the fluid flow control valve does not comprise a spring for biasing the piston's beveled head against the seat of the upper portion. Preferably, the bleed hole is configured for receiving a piston jet therein, said piston jet for allowing the diameter of the bleed hole to be modified.

A third embodiment comprising a refueling apparatus for use in refilling a container with a fluid, said container having air space above a fluid space, said fluid having a fluid level within said container, said refueling apparatus comprising: a fluid flow control valve, said fluid flow control valve connecting with a fluid source containing fluid, wherein said fluid is able to travel from said fluid source through said fluid flow control valve and into said container when said fluid flow control valve is open, and wherein when said fluid flow control valve is closed said fluid is prevented from flowing through said fluid flow control valve, said fluid flow control valve comprising a valve body, said valve body comprising an upper portion and a lower portion, said upper portion comprising an orifice defining a tapered seat configured for mating engagement with a beveled edge of the head of a piston, wherein the internal space of the upper portion defines a first chamber, said fluid flow control valve comprising an upper fluid bleed passage terminating at an upper port, said upper port configured for connecting with a supply line connecting with a float control module at an inlet port, said lower portion having a piston housing configured for receiving said piston therein, said piston housing having an internal sidewall defining an open topped cylinder having an end wall, the piston slidably received within said cylinder, the space within the cylinder between the end wall and the piston defining a second chamber, wherein at least one lateral fluid flow passage is defined in said internal sidewall, said lateral fluid flow passage for allowing fluid passing through the fluid flow control valve to be conveyed into the container, wherein said piston's head sealing against the seat closes the lateral fluid flow passages, said lower portion having an end wall at generally the second end of the lower portion, said lower portion comprising a lower port interconnecting said second chamber with a lower fluid bleed passage, said lower fluid bleed passage configured to fluidly connect with said upper fluid bleed passage, said piston having said head with said beveled edge, said edge configured for creating a mating seal against said tapered seat, said piston having an external sidewall having at least one sidewall groove configured for receiving at least one sealing member therein for slidably sealing the piston's external sidewall to the housing's internal sidewall, wherein the said head further comprising a bleed hole defined there-through, said bleed hole interconnecting the first chamber with the second chamber; a float control module, said float control module comprising said inlet port, said inlet port interconnected with an outlet port in said float control module, said float control module having an upper float bore and a lower float bore defined therein, said upper float bore connecting with said lower float bore via a float pin passageway, the float control module comprising an air vent passageway extending through said module for interconnecting the upper float bore with said container air space, said air vent passageway for enabling venting of air into and out of the upper float bore, wherein the upper float bore receives therein a float, the float having an upper end and a lower end, the lower end having a pin extending there-from, said pin extending through the float pin passageway and connecting with a lower float base, the float control module comprising said outlet port extending through said module for interconnecting the lower float bore with said fluid space of said container, when the fluid level is below a preset level in said container, a fluid pressure difference between the first chamber and the second chamber moves the piston away from said seat, allowing the fluid to flow from the fluid source, through the fluid flow control valve, out said lateral fluid flow passage, and into said container, wherein as said fluid level raises, said float raises within said upper float bore and connected base raises within said lower float bore until raising of said float brings said base into sealing engagement with a sealing face thereby by blocking fluid passage from the supply line through said inlet port and out said outlet port, thereby shutting off fluid flow through the bleed passage, causing an equalization of pressure between the first and second chambers, the pressure difference urging the piston's beveled head into sealing engagement with the seat, shutting off the flow of fluid from the fluid inlet through the fluid flow control valve; and a testing module, wherein said testing module comprises means blocking said fluid passage from the supply line through said inlet port and out said outlet port thereby simulating a predetermined fill level in said container and allowing the function of the float control module to be tested. Preferably, the testing module further comprises a reset means. Preferably, the fluid flow control valve does not comprise a spring for biasing the piston's beveled head against the seat of the upper portion. Preferably, the bleed hole is configured for receiving a piston jet therein, said piston jet for allowing the diameter of the bleed hole to be modified.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the claimed invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

We claim:

1. A refueling apparatus for use in refilling a container with a fluid from a fluid source, said refueling apparatus comprising:
   a fluid flow control valve module; a fluid level sensor module; and a testing module;
   said fluid flow control valve module having a fluid passage there-through for connection with said fluid source, said fluid flow control valve module having a shutoff valve, wherein said fluid is able to travel from said fluid source through said fluid flow control valve module and into said container when said shutoff valve is open, and wherein when said shutoff valve is closed said fluid is prevented from flowing through said fluid flow control valve module, wherein said fluid level sensor module is able to control the opening and closing of said shutoff valve;
   said fluid level sensor module having a sensor configured sensing the fluid level in said container, said fluid level sensor module configured for closing said fluid flow control valve module upon said sensor sensing that said fluid level is higher than a predetermined level in said container and opening said fluid flow control valve module upon said sensor sensing that said fluid level is lower than a predetermined level in said container; and
   said testing module for simulating a predetermined fill level in said container, said testing module comprising a valve member blocking said fluid passage from a supply line through an inlet port and out an outlet port thereby allowing the function of the fluid level sensor module to be tested.

2. A refueling apparatus for use in refilling a container with a fluid from a fluid source, said container having air space above a fluid space, said fluid having a fluid level within said container, said refueling apparatus comprising:
   a fluid flow control valve; a float control module having an inlet port; and a testing module;
   said fluid flow control valve connecting with said fluid source containing fluid, wherein said fluid is able to travel from said fluid source through said fluid flow control valve and into said container when said fluid flow control valve is open, and wherein when said fluid flow control valve is closed said fluid is prevented from flowing through said fluid flow control valve, said fluid flow control valve comprising a valve body, said valve body comprising an upper portion and a lower portion, said fluid flow control valve comprising a piston having a head, said head having a beveled edge,
   said upper portion comprising an orifice defining a tapered seat configured for mating engagement with said beveled edge, wherein the internal space of the upper portion defines a first chamber,
   said lower portion having a piston housing configured for receiving said piston therein, said piston housing having an internal sidewall defining an open topped cylinder having an end wall, the piston slidably received within said cylinder, the space within the cylinder between the end wall and the piston defining a second chamber, wherein at least one lateral fluid flow passage is defined in said internal sidewall, said at least one lateral fluid flow passage for allowing fluid passing through the fluid flow control valve to be conveyed into the container, wherein said piston's head sealing against the seat closes said at least one lateral fluid flow passage, said lower portion comprising a lower port interconnecting said second chamber with a bleed passage terminating at an upper port, said upper port configured for connecting with a supply line connecting with said float control module at said inlet port, said piston having said head with said beveled edge, said edge configured for creating a mating seal against said tapered seat, said piston having an external sidewall having at least one sidewall groove configured for receiving at least one sealing member therein for slidably sealing the piston's external sidewall to the housing's internal sidewall, wherein the said head further comprising a bleed hole defined therethrough, said bleed hole interconnecting the first chamber with the second chamber;
   said float control module comprising said inlet port, said inlet port interconnected with an outlet port in said float control module, said float control module having an upper float bore and a lower float bore defined therein, wherein when the fluid level is below a preset level in said container, the float control module allows the flow of fluid through said inlet port to said outlet port, and wherein when the fluid level is above a preset level in said container, the float control module blocks the flow of fluid through said inlet port to said outlet port causing a fluid pressure difference between the first chamber and the second chamber which moves the piston away from said seat, allowing the fluid to flow from the fluid source, through the fluid flow control valve, out said lateral fluid flow passage, and into said container, wherein as said fluid level raises, a float raises within said upper float bore and connected base raises within said lower float bore until raising of said float brings said base into sealing engagement with a sealing face thereby by blocking fluid passage from the supply line through said inlet port and out said outlet port, thereby shutting off fluid flow through the bleed passage, causing an equalization of pressure between the first and second chambers, the pressure difference urging the piston's beveled head into sealing engagement with the seat, shutting off the flow of fluid from the inlet port through the fluid flow control valve; and said testing module comprises a valve member configured for blocking said fluid passage from the supply line through said inlet port and out said outlet port thereby simulating a predetermined fill level in said container and allowing the function of the float control module to be tested.

3. The refueling apparatus of claim 2, wherein the float control module comprises:

said upper float bore connecting with said lower float bore via a float pin passageway, the float control module comprising an air vent passageway extending through said module for interconnecting the upper float bore with said container air space, said air vent passageway for enabling venting of air into and out of the upper float bore, wherein the upper float bore receives therein a float, the float having an upper end and a lower end, the lower end having a pin extending there-from, said pin extending through the float pin passageway and connecting with a lower float base, the float control module comprising said outlet port extending through said module for interconnecting the lower float bore with said fluid space of said container, wherein when the fluid level is below a preset level in said container, a fluid pressure difference between the first chamber and the second chamber moves the piston away from said seat, allowing the fluid to flow from the fluid source, through the fluid flow control valve, out said lateral fluid flow passage, and into said container, wherein as said fluid level raises, said float raises within said upper float bore and connected base raises within said lower float bore until raising of said float brings said base into sealing engagement with a sealing face thereby by blocking fluid passage from the supply line through said inlet port and out said outlet port, thereby shutting off fluid flow through the bleed passage, causing an equalization of pressure between the first and second chambers, the pressure difference urging the piston's head having a beveled edge into sealing engagement with the seat, shutting off the flow of fluid from the inlet port through the fluid flow control valve.

4. The refueling apparatus of claim 2, wherein said testing module further comprises a reset means.

5. The refueling apparatus of claim 2, wherein said fluid flow control valve does not comprise a spring for biasing the piston's head having a beveled edge against the seat of the upper portion.

6. The refueling apparatus of claim 2, wherein said bleed hole is configured for receiving a piston jet therein, said piston jet for allowing the diameter of the bleed hole to be modified.

7. A refueling apparatus for use in refilling a container with a fluid from a fluid source, said container having air space above a fluid space, said fluid having a fluid level within said container, said refueling apparatus comprising:

a fluid flow control valve; a float control module having an inlet port; and a testing module;

said fluid flow control valve connecting with said fluid source containing fluid, wherein said fluid is able to travel from said fluid source through said fluid flow control valve and into said container when said fluid flow control valve is open, and wherein when said fluid flow control valve is closed said fluid is prevented from flowing through said fluid flow control valve, said fluid flow control valve comprising a valve body, said valve body comprising an upper portion and a lower portion, said fluid flow control valve comprising a piston having a head, said head having a beveled edge, said beveled edge configured for creating a mating seal against a tapered seat, said upper portion comprising an orifice defining said tapered seat configured for mating engagement with said beveled edge, wherein the internal space of the upper portion defines a first chamber, said fluid flow control valve comprising an upper fluid bleed passage terminating at an upper port, said upper port configured for connecting with a supply line connecting with said float control module at an inlet port, said lower portion having a piston housing configured for receiving said piston therein, said piston housing having an internal sidewall defining an open topped cylinder having an end wall, the piston slidably received within said cylinder, the space within the cylinder between the end wall and the piston defining a second chamber, wherein at least one lateral fluid flow passage is defined in said internal sidewall, said lateral fluid flow passage for allowing fluid passing through the fluid flow control valve to be conveyed into the container, wherein said beveled edge sealing against the seat closes the lateral fluid flow passages, said lower portion having an end wall at generally the second end of the lower portion, said lower portion comprising a lower port interconnecting said second chamber with a lower fluid bleed passage, said lower fluid bleed passage configured to fluidly connect with said upper fluid bleed passage, said piston having an external sidewall having at least one sidewall groove configured for receiving at least one sealing member therein for slidably sealing the piston's external sidewall to the housing's internal sidewall, wherein the said head further comprising a bleed hole defined therethrough, said bleed hole interconnecting the first chamber with the second chamber;

said float control module comprising said inlet port, said inlet port interconnected with an outlet port in said float control module, said float control module having an upper float bore and a lower float bore defined therein, said upper float bore connecting with said lower float bore via a float pin passageway, the float control module comprising an air vent passageway extending through said module for interconnecting the upper float bore with said container air space, said air vent passageway for enabling venting of air into and out of the upper float bore, wherein the upper float bore receives therein a float, the float having an upper end and a lower end, the lower end having a pin extending there-from, said pin extending through the float pin passageway and connecting with a lower float base, the float control module comprising said outlet port extending through said module for interconnecting the lower float bore with said fluid space of said container, when the fluid level is below a preset level in said container, a fluid pressure difference between the first chamber and the second chamber moves the piston away from said seat, allowing the fluid to flow from the fluid source, through the fluid flow control valve, out said lateral fluid flow passage, and into said container, wherein as said fluid level raises, said float raises within said upper float bore and connected base raises within said lower float bore until raising of said float brings said base into sealing engagement with a sealing face thereby by blocking fluid passage from the supply line through said inlet port and out said outlet port, thereby shutting off fluid flow through the bleed passage, causing an equalization of pressure between the first and second chambers, the pressure difference urging the piston's beveled head into sealing engagement with the seat, shutting off the flow of fluid from the inlet port through the fluid flow control valve; and said testing module comprises a valve member configured for blocking said fluid passage from the supply line through said inlet port and out said outlet port thereby simulating a predetermined fill level in said container and allowing the function of the float control module to be tested.

8. The refueling apparatus of claim 7, wherein said testing module further comprises a reset means.

9. The refueling apparatus of claim 7, wherein said fluid flow control valve does not comprise a spring for biasing the piston's beveled head against the seat of the upper portion.

10. The refueling apparatus of claim 7, wherein said bleed hole is configured for receiving a piston jet therein, said piston jet for allowing the diameter of the bleed hole to be modified.

* * * * *